3,301,469
VALVES WITH ELECTRICALLY OPERATED
CLOSURE MEANS
O O Shurtleff, Austin, Tex., assignor to Chatleff Controls,
Inc., Austin, Tex., a corporation of Texas
Filed Jan. 8, 1964, Ser. No. 336,447
9 Claims. (Cl. 230—22)

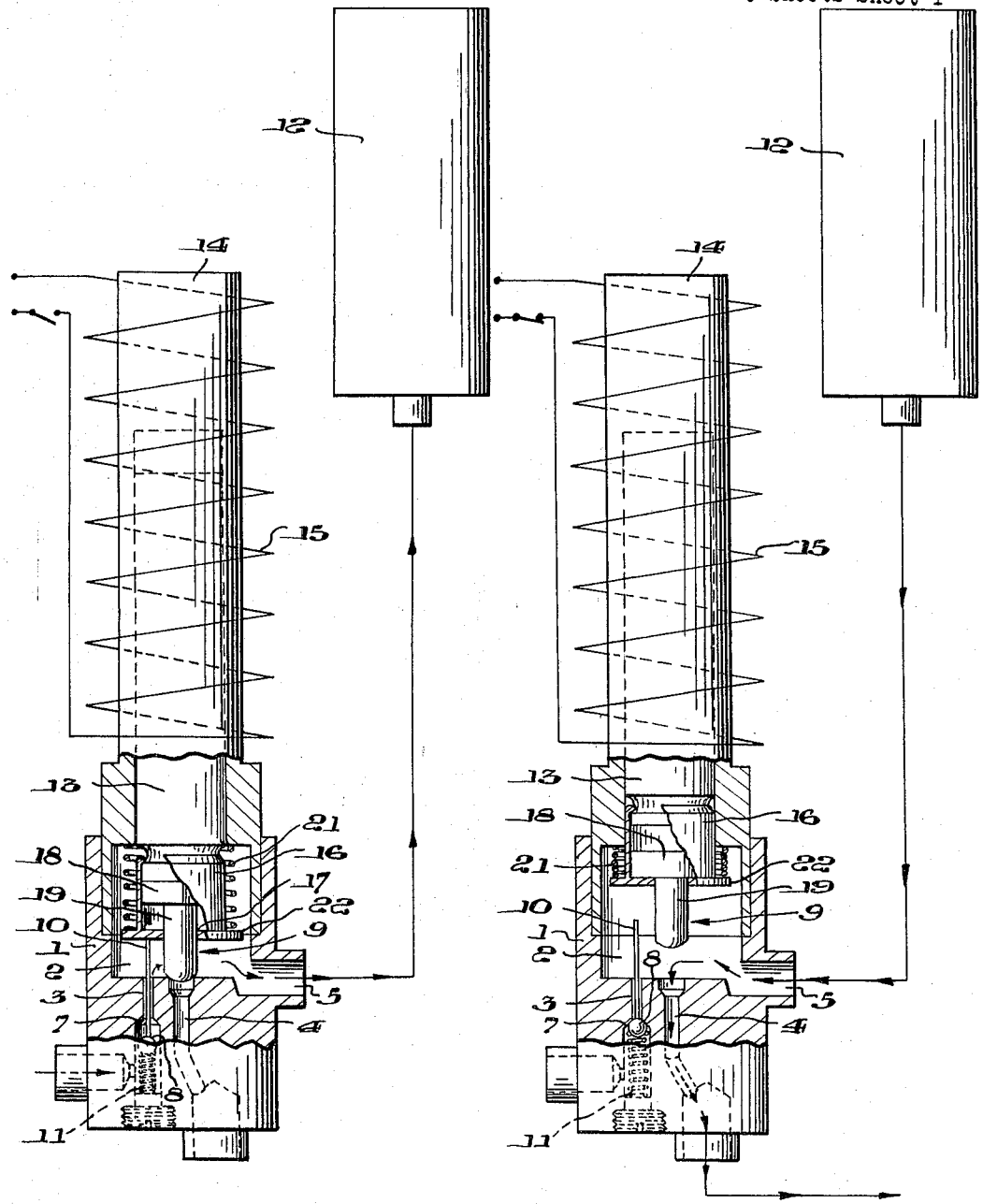

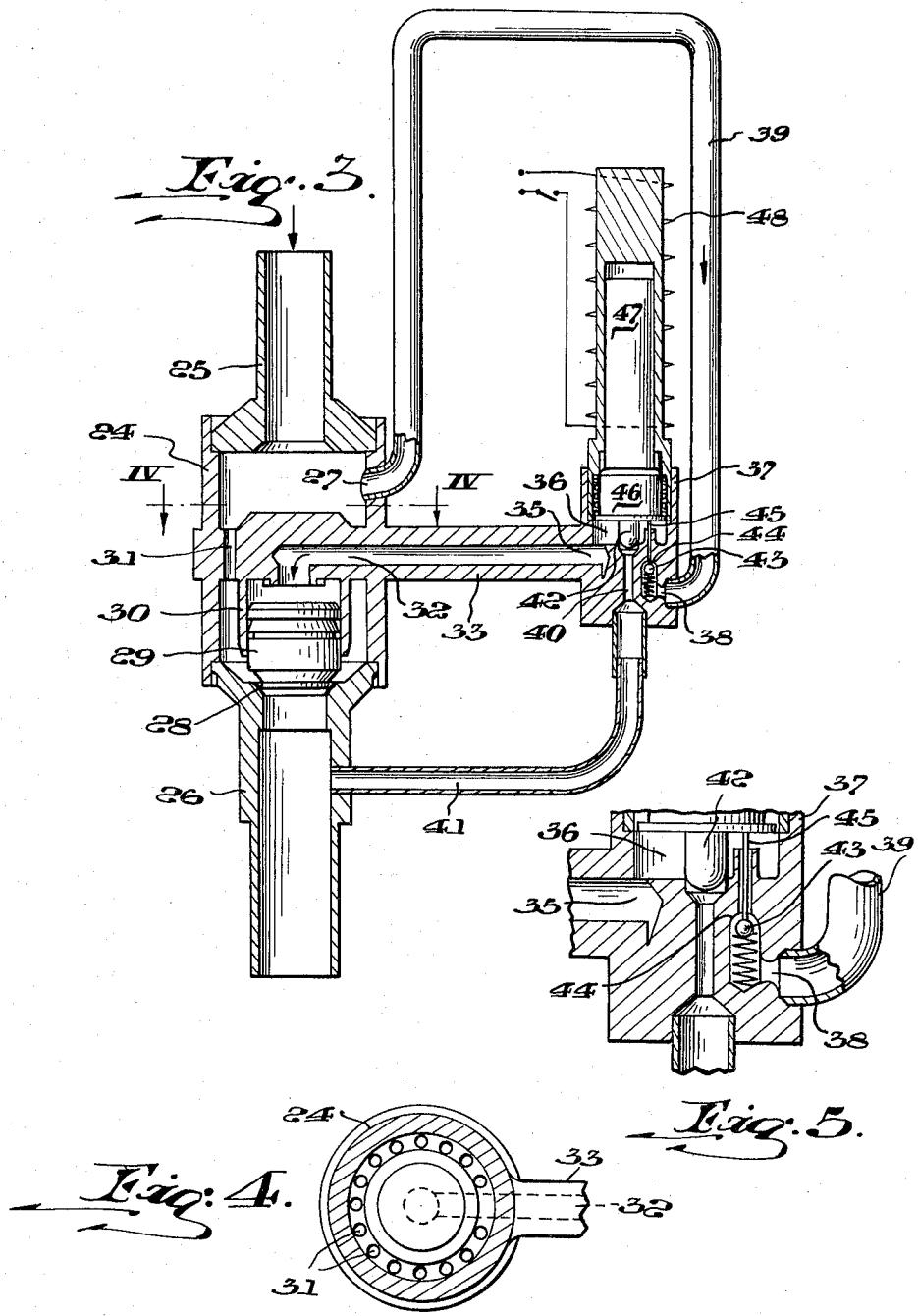

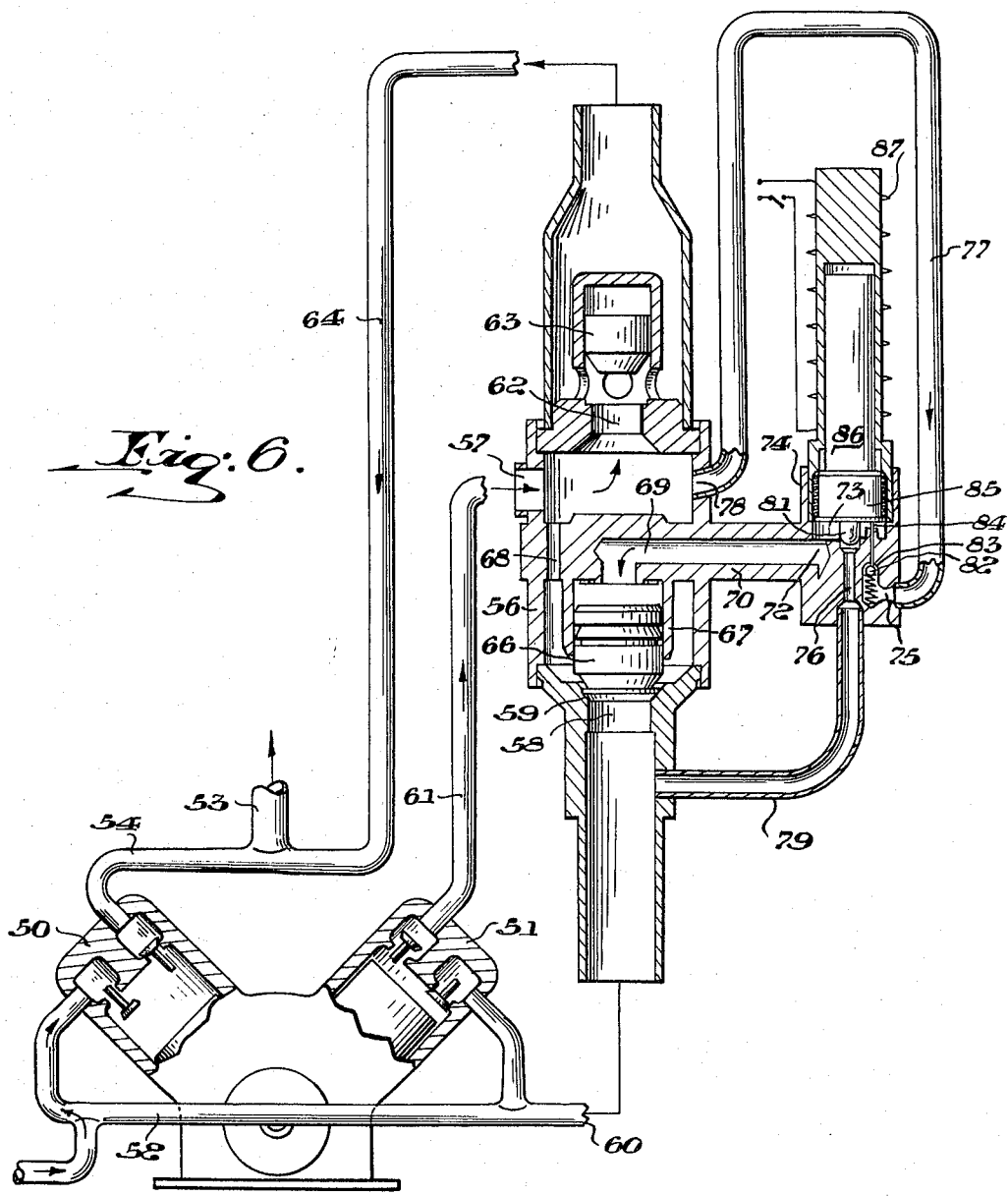

This invention relates to valves, and more particularly to valves having multiple closures, one of which is electrically operated.

It is among the objects of this invention to provide a valve which always seats with the pressure instead of against it, which requires only one solenoid to operate two valve members, which is highly suitable for use as a pilot valve for controlling a main valve, which can be used for both filling and dumping a container, which will prevent a shut-off valve with which it is used from chattering in a line carrying a fluctuating fluid flow, and which can be used as an unloading valve for a two cylinder compressor.

The invention is illustrated in the accompanying drawings, in which

FIG. 1 is a side view, partly in longitudinal section, of my solenoid valve mounted in a fluid line that is filling a container;

FIG. 2 is a view similar to FIG. 1, but showing the valve reversed so that the container is emptying through the valve;

FIG. 3 is a longitudinal section through a valve system using my solenoid valve as a pilot valve for a larger shut-off valve;

FIG. 4 is a cross section taken on the line IV—IV of FIG. 3;

FIG. 5 is an enlarged section of the lower portion of the solenoid valve shown in FIG. 3; and FIG. 6 is a view similar to FIG. 3, but with the large valve provided with a check valve and connected in a compressor system.

Referring to FIGS. 1 and 2 of the drawings, a valve housing 1 is provided with a central chamber 2 and with an inlet passage 3 and an outlet passage 4 opening into the chamber. The chamber also is provided with a combined inlet and outlet port 5. The inner portion of the outlet passage is disposed axially of the valve housing, and the inner portion of the inlet passage is disposed at one side of and parallel to it. The combined inlet and outlet port may be in any suitable location, but preferably is at one side of the housing.

Assuming for the sake of description that the valve is shown vertically, the lower portion of inlet passage 3 is enlarged to form at its upper end a downwardly facing valve seat 7. Loosely disposed in the enlarged portion of the passage is a movable valve member, such as a ball 8, for engaging the seat to close the passage. The upper end or entrance to the outlet passage 4 normally is closed by movable closure means 9 which, when in the lower position, engage the upper end of a stem 10 that extends down loosely through the upper portion of the inlet passage and is attached to the ball for holding it down away from the valve seat against the resistance of coil spring 11 on which the ball rests. With the inlet passage open and the outlet passage closed as shown in FIG. 1, fluid under pressure entering the inlet passage from a suitable source can flow up past the ball and along the small stem into the valve chamber and then out through the lateral port 5 and up through a conduit (not shown) into the bottom of a container 12 of any desired size to fill the container.

In order to empty or dump the container, the inlet passage must be closed and the outlet passage opened as shown in FIG. 2 so that the fluid from the container can enter valve chamber 2 through port 5 and then leave the valve through its outlet passage 4. To reverse the valve for this purpose, it is operated electrically to raise the closure means far enough to open the outlet passage and to allow spring 11 to raise the ball to its seat 7. The electrical means for retracting the closure means in this manner preferably consist of a solenoid. The solenoid is formed from a core 13 slidably mounted in a vertical bore in an upward extension 14 of the valve housing, and from a solenoid coil 15 encircling the extension. When the coil is energized it raises the core, which is connected to the closure means so that the latter will be lifted in the valve chamber. The closure means preferably include a cylinder cage 16 crimped onto the lower end of the solenoid core and extending down below it. The bottom of the cage is spaced some distance from the lower end of the core and is provided with a central opening 17 directly over the outlet passage. Slidably mounted in the cage is a plunger 18, from the center of which a valve plug 19 extends down through the cage opening for seating in the upper end of the outlet passage. While the solenoid coil is de-energized, the core rests on top of the plunger to hold the closure plug tightly seated as shown in FIG. 1. In this position the bottom of the cage is spaced below the plunger and depresses the ball stem to unseat the ball.

When the coil is energized as shown in FIG. 2, the core and cage are raised alone until the bottom of the cage strikes the bottom of plunger 18 and lifts the closure plug from its seat. The velocity acquired by the rising cage before it strikes the plunger helps jerk the closure plug away from its seat, against which the fluid pressure in the valve chamber attempts to hold it. When the coil is de-energized again, all of the elevated parts drop and the bottom of the cage strikes the upper end of the ball stem and knocks the ball down away from its seat against the fluid pressure below it attempting to keep it seated.

Since the valve may not always be used in the vertical position shown, it is desirable to encircle cage 16 with a coil spring 21 that is compressed between the top of valve chamber 2 and an integral collar 22 on the lower end of the cage. This spring will insure the closure plug moving forward into passage-closing position whenever the solenoid coil is de-energized.

It will be observed that both the ball and the closure means seat with the fluid pressure in the system. That is, while the parts are in the positions shown in FIG. 1, the fluid pressure in the valve chamber aids in holding the valve plug 18 on its seat. When the valve is reversed so that the parts attain the positions shown in FIG. 2, the high pressure at the main inlet of the valve helps to hold the ball against its seat. Therefore, the greater the pressure in the line the tighter the seated valve part seats, so there are no pressure limitations on this valve as far as seating is concerned. The single solenoid operates all movable valve parts and thereby simplifies the construction of the valve and reduces its cost as compared with one in which a separate solenoid is required for each closure.

A valve such as just described is most reasonably made in small sizes. Therefore, its general overall usage is limited because of the small passages that such a valve require. Nevertheless, the valve is very well suited for use as a pilot valve for operating a much larger valve where the size of the passages is not limited. Such a valve system is shown in FIGS. 3, 4 and 5. In FIG. 3 a main valve housing 24 is shown with an inlet 25 at its top, an outlet 26 at its bottom and a lateral pressure port 27 in its side wall. The outlet of the housing is provided with a valve seat 28 adapted to be engaged by a movable valve element 29 for shutting off the passage through the housing. Element 29 is associated with a cylinder 30 and is movable forward toward the valve seat by fluid pressure in the cylinder. The cylinder is rigidly mounted in the center of the housing. Although element 29 could be a diaphragm or the like, it preferably is a piston that is slidably mounted in the cylinder. The top or back of the cylinder is supported by the side wall of the valve housing. If supported all of the way around, the connecting web outside of the cylinder is provided with a number of passages 31 connecting the housing inlet with the housing outlet. The top of the cylinder is provided with a passage 32 extending upward from inside the cylinder and then laterally through the housing side wall and a rigid tube 33 projecting therefrom.

The outer end of this tube is connected to the combined inlet and outlet port 35 of the chamber 36 in a solenoid pilot valve housing 37 like the one shown in FIG. 1. The chamber has an inlet passage 38 offset from its vertical axis, and the outer end of the passage is connected by a tube 39 to the pressure port 27 of the main valve housing. Beside the inlet passage there is a central outlet passage 40, the outer end of which is connected by a tube 41 with the lower part of the main valve housing at the downstream side of the seat 28. The entrance to the outlet passage normally is closed by a closure plug 42, and a spring-pressed ball 43 in the inlet passage normally is held away from its seat 44 therein by a stem 45 engaged by the bottom of cage 46 connected to the lower end of a solenoid core 47, which can be raised when an encircling solenoid coil 48 is energized.

As long as the coil remains de-energized, the fluid in main valve housing 24 is in communication, through tube 39 and the pilot valve, with the inside of cylinder 30 behind the piston, whereby the fluid pressure created in the cylinder will hold the piston against its seat and thereby maintain the main valve closed. When it is desired to open the main valve, the solenoid coil is energized so that inlet passage 38 will be closed and outlet passage 40 opened. This places the rear end of the cylinder 30 in communication, through the pilot valve, with tube 41 leading to the outlet of the main valve housing. Since this is a low pressure area, the piston rises in the cylinder to open the main valve so that fluid can flow straight through it.

Such a valve system will not chatter or hammer when the main line carries a fluctuating flow. Ordinary solenoid valves, when placed in a stream of irregular flow, will be noisy because the shut-off valve piston will oscillate with pulsations of the stream. That cannot happen with my shut-off valve, because as long as the solenoid coil is energized the fluid pressure in the cylinder behind the piston will be less than the pressure of the fluid flowing through the main valve housing, so the piston will remain fully retracted.

The advantage just explained of my valve system makes it especially suitable for unloading a compressor which has a fluctuating characteristic of flow. Such an arrangement is shown in FIG. 6, where a conventional two cylinder compressor is disclosed. Low pressure fluid is drawn into the compressor cylinders 50 and 51 alternately and is compressed from a suction manifold 52, in the cylinders and ejected from them alternately into a common conductor 53 that leads to whatever is to receive fluid under pressure. The outlet of cylinder 50 is connected by a pipe 54 to the conductor. The outlet of the other cylinder is connected to the same conductor through my special valve system, which is shown greatly enlarged in comparison with the compressor.

Like the main valve shown in FIG. 3, the main valve of this system has a housing 56 provided with an inlet 57 and with an outlet 58 encircled by a valve seat 59. The outlet is connected by a pipe 60 to the inlet manifold of the compressor. The valve inlet is connected by a pipe 61 to the outlet of compressor cylinder 51. The valve housing also is provided with a second outlet 62 that is controlled by a check valve 63 which permits flow only in a direction away from the housing. This second outlet is connected by a pipe 64 to the common conductor 53. It will be seen that the outlets of both compressor cylinders are connected with the common conductor, one cylinder being connected directly and the other cylinder being connected through valve housing 56.

In normal operation of the compressor, outlet 58 of the valve housing is closed by a movable valve element, such as a piston 66 for example, engaging seat 59. The piston is slidably mounted in a cylinder 67 that is secured in the center of the valve housing. The back of the cylinder is supported by the side wall of the housing and is provided around the cylinder with a number of passages 68 that connect the housing inlet with outlet 58. The top of the cylinder is provided with a passage 69 extending upward and then laterally through the housing side wall and a rigid tube 70 projecting from it.

The outer end of this tube is connected to a solenoid pilot valve the same as the one shown in FIG. 3. Thus, the tube is connected to the combined inlet and outlet port 72 of the chamber 73 in the pilot valve housing 74. This chamber has an inlet passage 75 and an outlet passage 76. The outer end of the inlet passage is connected by a tube 77 to a pressure port 78 in the side of the main valve housing 56. The outer end of the outlet passage is connected by a tube 79 with the lower part of the main valve housing at the downstream side of its seat 59. The entrance to the outlet passage normally is closed by a closure plug 81, while a spring-pressed ball 82 in the inlet passage normally is held away from its seat 83 therein by a stem 84 engaged by the bottom of a closure cage 85 that is connected to the lower end of a solenoid core 86. This core can be raised when an encircling solenoid coil 87 is energized.

While the coil is de-energized, the high pressure fluid in the main valve housing 56 acts through tube 77 and the pilot valve against the back of piston 66 to hold the piston tightly against seat 59. Consequently, compressed fluid from cylinder 51 of the compressor enters the main valve housing through its inlet and leaves it through the check valve 63. The flow of fluid is the same as if the outlet of cylinder 51 were connected directly to the common conductor 53.

However, the full capacity of the compressor is not always needed, but since stopping and starting the compressor can be uneconomic, it is preferred to valve the system so that the discharge of one of the compressor cylinders will be bypassed back to its inlet, thereby cutting the capacity of the compressor in half. This can be done by energizing the solenoid coil in order to reverse the pilot valve, thereby raising the closure plug 81 so that the outlet passage is opened and the inlet passage is closed. The valve cylinder 67 then is in communication with the suction side of compressor cylinder 51 through tube 79 and pipe 60, so piston 66 is retracted from its seat 59. This places the inside of the main valve housing 56 in communication with the suction side of compressor cylinder 51, and the higher pressure in pipe 64 closes the check valve with the result that high pressure fluid from the outlet of cylinder 51 circulates through the main valve and back to the compressor. Cylinder 51 thus becomes ineffective, so conductor 53 receives fluid under pressure only from the other compressor cylinder. When it is desired to put cylinder 51 back in service, the solenoid coil is de-energized, piston 66 closes valve outlet 58 and fluid from compressor cylinder 51 then opens the check valve and flows to conductor 53 again. As in the valve system shown in FIG. 3, there will be no chattering of the piston on its seat. The piston will always be fully open or fully closed, regardless of fluctuations in flow through valve housing 56. This valve system is simple and compact enough to be mounted directly on the compressor.

I claim:

1. A valve comprising a housing provided with a chamber having a combined inlet and outlet port, the housing being provided with an inlet passage and an outlet passage opening into said chamber, the inlet passage having a valve seat therein facing away from said chamber, movable closure means inside said chamber normally closing the entrance to said outlet passage, a movable valve member in said inlet passage for engaging said seat, a stem extending from said member into said chamber and normally engaged by said closure means to hold the valve member away from its seat to permit fluid flow through the inlet passage into the chamber and out through said port, electrically operated means for withdrawing said closure means from the outlet passage, and a spring for moving said valve member against its seat when the closure means is withdrawn, whereby fluid entering the chamber from said port can escape through said outlet passage.

2. A valve comprising a housing provided with a chamber having a combined inlet and outlet port, the housing being provided with inlet and outlet passages having substantially parallel portions opening into said chamber, the inlet passage having a valve seat therein facing away from said chamber, movable closure means inside said chamber movable axially of said outlet passage and normally closing the entrance thereto, a movable valve member in said inlet passage for engaging said seat, a stem extending from said member into said chamber and normally engaged by said closure means to hold the valve member away from its seat to permit fluid flow through the inlet passage into the chamber and out through said port, a solenoid core operatively connected to said closure means, a solenoid coil encircling said core and adapted when electrically energized to cause the core to withdraw the closure means from the outlet passage, and a spring for moving said valve member against its seat when the closure means is withdrawn, whereby fluid entering the chamber from said port can escape through said outlet passage.

3. In a valve system, a main valve housing provided with an inlet and an outlet and a pressure port, the outlet being provided with a valve seat, a cylinder rigidly mounted in the housing, a movable valve element associated with the cylinder and movable forward by fluid pressure in the cylinder to engage said seat, the cylinder being provided in its back with a passage extending out of the housing, a pilot valve housing provided with a chamber having a combined inlet and outlet port connected with said cylinder passage, the pilot housing being provided with an inlet passage and an outlet passage opening into said chamber, the inlet passage having a valve seat therein facing away from said chamber, a conduit connecting said pressure port with the outer end of said inlet passage, a conduit connecting the outer end of the outlet passage with the outlet of the main valve housing at the downstream side of its seat, movable closure means in said chamber normally closing the entrance to said outlet passage, a movable valve member in said inlet passage for engaging the seat therein, a stem extending from said member into said chamber and normally engaged by said closure means to hold the valve member away from its seat to permit fluid flow from said main housing into the chamber and out through said combined inlet and outlet port to said cylinder to hold said valve element against its seat, electrically operated means for withdrawing said closure means from the outlet passage, and a spring for moving said valve member against its seat when the closure means is withdrawn, whereby fluid in said cylinder can escape through said chamber and outlet passage to permit said valve element to move away from its seat and thereby allow fluid to flow through the main valve housing.

4. In a valve system, a main valve housing provided with an inlet and an outlet and pressure port, the outlet being provided with a valve seat, a cylinder rigidly mounted in the housing, a movable valve element associated with the cylinder and movable forward by fluid pressure in the cylinder to engage said seat, the cylinder being provided in its back with a passage extending out of the housing, a pilot valve housing provided with a chamber having a combined inlet and outlet port connected with said cylinder passage, the pilot housing being provided with inlet and outlet passages having substantially parallel portions opening into said chamber, the inlet passage having a valve seat therein facing away from said chamber, a conduit connecting said pressure port with the outlet end of said inlet passage, a conduit connecting the outer end of the outlet passage with the outlet of the main valve housing at the downstream side of its seat, movable closure means in said chamber movable axially of said outlet passage and normally closing the entrance thereto, a movable valve member in said inlet passage for engaging the seat therein, a stem extending from said member into said chamber and normally engaged by said closure means to hold the valve member away from its seat to permit fluid flow from said main housing into the chamber and out through said combined inlet and outlet port to said cylinder to hold said valve element against its seat, a solenoid core operatively connected to said closure means, a solenoid coil encircling said core and adapted when electrically energized to cause the core to withdraw the closure means from the outlet passage, and a spring for moving said valve member against its seat when the closure means is withdrawn, whereby fluid in said cylinder can escape through said chamber and outlet passage to permit said valve element to move away from its seat and thereby allow fluid to flow through the main valve housing.

5. A valve in accordance with claim 4, in which said closure means include a cage rigidly mounted on the inner end of said core and provided with an opening aligned with said outlet passage, a plunger slidably mounted in said cage and normally engaging the core, and a plug extending through said cage opening and secured to said plunger.

6. In a valve system according to claim 3, said main valve housing also being provided with a second outlet, and a check valve in said second outlet permitting fluid flow therethrough away from said main housing when said valve element is on its seat.

7. In a valve system according to claim 6, a compressor having an inlet connected with the first-mentioned main housing outlet and having an outlet connected with said main housing inlet, and a conduit connected to said second outlet for receiving compressed fluid through said main valve housing from the compressor while said valve element is on its seat.

8. In combination with a two-cylinder compressor in which fluid is drawn into each cylinder alternately and then compressed and forced out, a suction line connected with each cylinder inlet, a conductor for compressed fluid, a conduit connecting the outlet of one of the compressor cylinders with said conductor, a main valve housing provided with an inlet and two outlets and a pressure port, a conduit connecting the outlet of the other of said compressor cylinders with said housing inlet, a conduit connecting one of said housing outlets with the inlet of said other compressor cylinder, said one housing outlet being provided with a valve seat, a cylinder rigidly mounted in the housing, a movable valve element associated with the valve cylinder and movable by fluid pressure in the cylinder to engage said seat, the cylinder being provided in its back with a passage extending out of the housing, a conduit leading from the other outlet of said housing to said conductor, a check valve in said other outlet for permitting flow therethrough away from the valve housing when said valve element is on its seat, a pilot valve housing provided with a chamber having a combined inlet and outlet port connected with said valve cylinder passage, the pilot housing being provided with an inlet passage and an outlet passage opening into said chamber, the inlet passage having a valve seat therein facing away from said chamber, a conduit connecting said pressure port with the outer end of said inlet passage, a conduit connecting the outer end of the outlet passage with said one outlet of the main valve housing at the downstream side of its seat, movable closure means in said chamber normally closing the entrance to said outlet passage, a movable valve member in said inlet passage for engaging the seat therein, a stem extending from said member into said chamber and normally engaged by said closure means to hold the valve member away from its seat to permit fluid flow from said main housing into the chamber and out through said combined inlet and outlet port to said valve cylinder to normally hold said valve element against its seat, electrically operated means for withdrawing said closure means from the outlet passage, and a spring for moving said valve member against its seat when the closure means is withdrawn, whereby fluid in said valve cylinder then can escape through said chamber and outlet passage to permit said valve element to move away from its seat and thereby cause fluid to flow through the main valve housing to the conduit leading to said compressor cylinder inlet.

9. In the combination recited in claim 8, said movable valve element being a piston and said closure means including a cage rigidly mounted on the inner end of said core and provided with an opening aligned with said outlet passage, a plunger slidably mounted in said cage and normally engaging the core, and a plug extending through said cage opening and secured to said plunger.

References Cited by the Examiner

UNITED STATES PATENTS

| | | | |
|---|---|---|---|
| 1,333,681 | 3/1920 | Riley | 137—625.27 |
| 2,197,320 | 4/1940 | Shenton | 251—130 |
| 2,479,359 | 8/1949 | Holt | 251—30 |
| 3,040,775 | 6/1962 | Ray | 137—596.17 |

M. CARY NELSON, *Primary Examiner.*

W. CLINE, *Assistant Examiner.*